United States Patent

[11] 3,623,740

[72] Inventor Edgar N. Rosenberg
San Diego, Calif.
[21] Appl. No. 66,256
[22] Filed Aug. 24, 1970
[45] Patented Nov. 30, 1971
[73] Assignee The United States of America as represented by the Secretary of the Navy

[54] SEAL FOR A STEEL-GLASS JOINT
5 Claims, 2 Drawing Figs.
[52] U.S. Cl. ............................................. 277/237,
114/177, 220/45, 277/3, 277/28
[51] Int. Cl. .................................................. F16j 15/14
[50] Field of Search ............................................. 220/45;
114/177; 277/3, 28, 92, 237

[56] References Cited
UNITED STATES PATENTS
2,140,672 12/1938 Gray et al. ..................... 277/237
2,175,868 10/1939 Bentley ......................... 277/3
3,400,411 9/1968 Harvey ......................... 277/237

Primary Examiner—Robert I. Smith
Attorneys—Richard S. Sciascia, Ervin F. Johnston and Thomas G. Keough ABSTRACT: A cylindrical submersible housing is connected to a hemispherical glass shell in a manner to minimize failure-producing tensile forces usually attendant such a juncture. An annular channel provided in the housing receives a cylindrical extension of the hemispherical shell. The small space formed between the inner walls of the annular channel and the cylindrical extension is filled with oil, at least one pair of gland-"O"-ring combinations hydrostatically isolate the fluid from the interior and exterior of the submersible. The oil and gland-"O"-ring combinations cooperate to hold the cylindrical extension from contacting the inner walls of the annular channel to eliminate lateral, tensile forces otherwise produced when a brittle material, such as glass, is subjected to high bearing forces. Higher pressure compensation is provided by a plurality of pairs of gland-"O"-ring combinations forming adjacent liquid-filled annular spaces each in fluid communication with one of a plurality of pressure regulators setting the pressure differential between adjacent annular spaces below that at which failure occurs across a gland-"O"-ring combination.

INVENTOR.
EDGAR N. ROSENBERG
BY
THOMAS G. KEOUGH
ERVIN F. JOHNSTON
ATTORNEYS

SEAL FOR A STEEL-GLASS JOINT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Submersibles carrying personnel to great depths are limited by affording only a slight opportunity for visual observations. This is largely due to the fact that, because of the immense pressures involved, only one or two sophisticated, small viewing ports are provided in the submersible's hull. At present, attempts to increase their observational capabilities call for including a glass wall since glass possesses the necessary strength characteristics, especially when configured in the form of a hemispherical shell. However, widespread employment of glass hemispherical shells has been prevented since self-induced, lateral, tensile forces are created at the surface where the shells are seated when the shells are subjected to extremely high longitudinal bearing forces. These lateral, tensile forces are self-destructing since the shells tend to tear themselves apart.

SUMMARY OF THE INVENTION

The present invention is directed to providing an assembly for sealing a joint to isolate the interior of a submersible from the extremely high pressure of deep water that includes a housing member having a peripheral channel for receiving a hemispherical glass shell provided with a cylindrical extension sized to slidably fit within the peripheral channel. A liquid fills the space formed between the cylindrical extension and the inner surfaces of the peripheral channel, and at least one pair of opposed gland-"O"-ring combinations hydrostatically seals the fluid filled space to ensure the separation of the cylindrical extension and the housing member preventing the buildup of self-destructive, tensile forces in the hemispherical shell.

A prime object is to provide an assembly for allowing greater visibility for submersibles.

Still another object of the invention is to provide an assembly for sealing the juncture involving at least one relatively brittle material which minimizes self-destructive, tensile forces.

Yet another object of the invention is to provide an assembly for enabling the joining of a hemispherical glass shell to a steel housing.

These and other objects of the invention will become readily apparent from the drawings when taken with the ensuing description.

DESCRIPTION OF THE PREFERRED EMBODIMENTS

Figure 1:
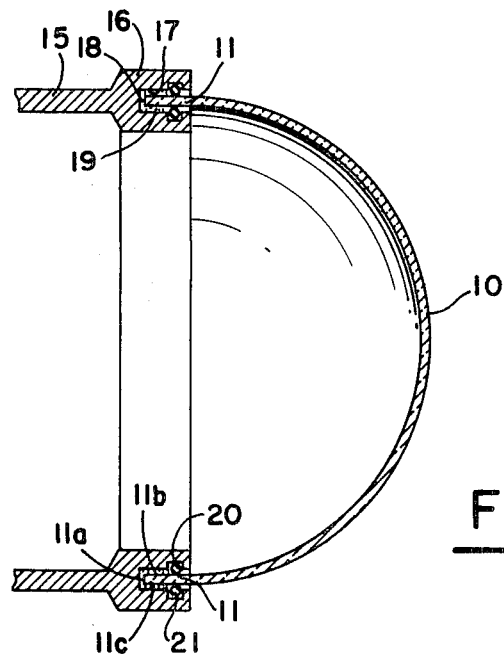
FIG. 1 is a cross-sectional view of a basic form of the invention.

Referring now to the drawings, a submersible having the capability for nearly omnidirectional visibility is provided by having a hemispherically shaped glass shell 10 carried on a conventional cylindrically shaped steel hull 15.

Glass is a superior material for construction of submersibles since it withstands the most crushing pressures of extreme ocean depths. However, irrespective of glass's high bearing strength, lateral, tensile forces are created where a hemispherical rim of glass abuts its mating surface. These tensile forces are sufficient to tear the shell apart and are one of the limiting factors which restrict the application of glass in deep submergence work.

Tests show that glass subjected to internal, tensile forces of as little as 1,000 p.s.i., fails and disintegrates. At a depth of 330 feet, at which depth a pressure of 10 atmospheres is exerted, a hemispherical shell having a 4-foot diameter opposes an area-pressure of nearly 26,600 pounds. If the shell has a 1-inch thickness, it is subjected to bearing forces of slightly less than 1,800 p.s.i. on its hemispherical rim where it fits onto its mating surface. Thus, it is apparent that relatively shallow depths create failure-producing forces in conventionally mounted shells.

This unfavorable situation is remedied by the present invention which calls for extending the hemispherical shell portion to form a continuously extending, cylindrical extension 11. Steel hull 15 is provided with an enlarged rim portion 16 shaped with an annular channel 17 having a lateral dimension slightly in excess of the width of the cylindrical extension.

A relatively small space 18, having a U-shaped, cross-sectional configuration, is created between the cylindrical extension and the inner surface of the annular channel and is filled with a liquid, preferably a relatively viscous oil 19. An inner and an outer gland-"O"-ring combination 20 and 21 seal the oil within space 18 and prevent the oil's being forced to the outside of, or the inside of, the submersible. The effectiveness of such gland-"O"-ring sealing, under such conditions, is well established within the state of the art, for a single gland-"O"-ring combination is capable of containing a pressure differential of up to 5,000 p.s.i.

In the example referred to above, in which a submersible is disposed at a depth of approximately 330 feet, the compressive bearing force exerted through cylindrical portion 11 is slightly less than 1,800 p.s.i. Incompressible oil 19 completely fills space 18 and, simultaneously, exerts an opposing uniform force of approximately 1,800 pounds against the load bearing surface 11a, as well as surfaces 11b and 11c, to prevent the buildup of any self-destructive, tensile forces among these surfaces. Although a pressure differential exists across inner and outer gland-"O"-ring combinations 20 and 21, this differential is a composite force, not strictly tensile in nature and insufficient to destroy the structural integrity of cylindrical extension 11.

In a second embodiment, far greater pressures are withstood by including opposing pairs of gland-"O"-ring combinations together with pressure regulators interposed in discrete spaces.

Figure 2:
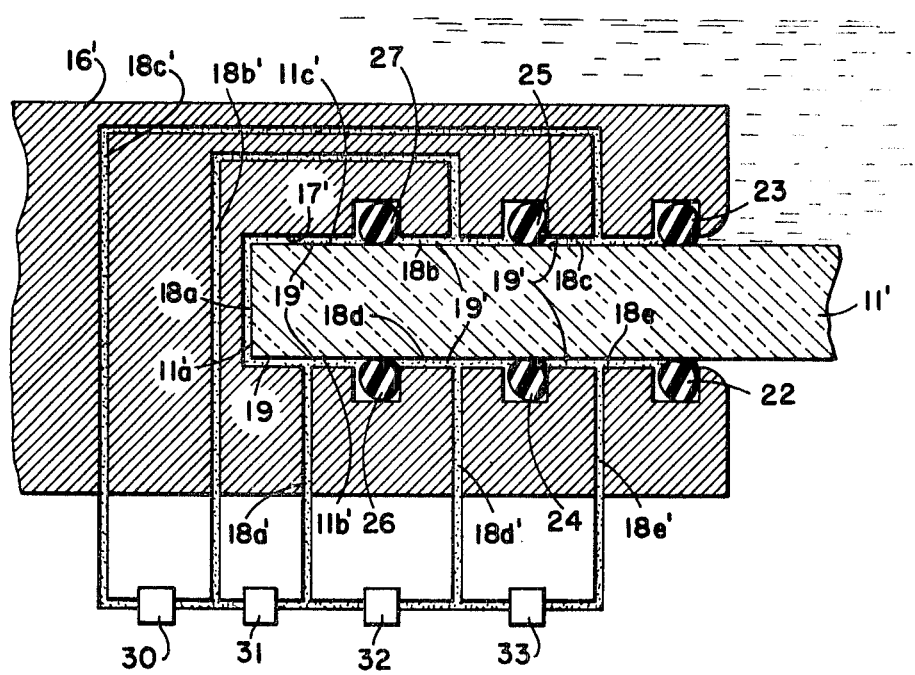
FIG. 2 is a cross-sectional depiction of a schematical representation of a pressure-regulating system applied to a second embodiment.

Turning to FIG. 2, a cross-sectional view of such an arrangement is depicted schematically, and calls for three sets of opposed pairs of gland-"O"-ring combinations 22 and 23, 24 and 25, and 26 and 27. Between a cylindrical extension 11' and an annular channel 17' provided in a modified, enlarged rim portion 16', a plurality of separate and discrete, annular spaces 18a, 18b, 18c, 18d, and 18e are separated from one another by particular ones of the gland-"O"-ring combinations. Each of the discrete, annular spaces is joined to its separate duct 18a', 18b', 18c', 18d', and 18e' in fluid engagement, via a liquid 19', with at least one of four pressure regulators 30, 31, 32, and 33.

The pressure regulators are of a type in widespread use employing a spring diaphragm mechanism preset to pass a pressurized volume of fluid exceeding a selected magnitude as determined by the spring's constant.

In the instant case, the pressure regulators are adjusted, or preset, to establish a pressure differential not exceeding the pressure differential at which discrete ones of the gland-"O"-ring combinations fail. That is to say, that in addition to the magnitude of tensile forces tolerable within cylindrical extension 11', the failure-differential pressure of the gland-"O"-ring combinations also determines the pressure differentials established by each of the pressure regulators.

By way of example, a submersible, having a 4-foot diameter hemispherical glass shell, is taken beyond 1,600 feet, at which level a pressure corresponding to 50 atmospheres is exerted. A compressive force of slightly less than 9,000 p.s.i. is transmitted through cylindrical extension 11'. An equal, opposing force of 9,000 p.s.i. in space 18a encloses surfaces 11a', 11b', and 11c' since the space is filled with noncompressible liquid 19'.

A 9,000 p.s.i. pressure is fed to one side of both pressure regulators 31 and 32 which function to reduce the pressure on their opposite sides by a predetermined amount, say for example, 3,000 pounds. Thus, the pressure at which the viscous fluid in spaces 18b and 18d is maintained, is in the neighborhood of slightly less than 6,000 p.s.i. The 6,000 p.s.i. pressure is fed to pressure regulators 30 and 33 and a further pressure reduction of approximately 3,000 pounds is effected to present a hydrostatic pressure of slightly less than 3,000 p.s.i. to liquid 19' filling spaces 18c and 18e.

By the above-described pressure-stepping process, no excessive, tensile stresses are created in the longitudinal reaches of cylindrical extension 11' and, simultaneously, gland-"O"-ring combinations separating adjacent spaces are not subjected to failure-producing pressure differentials.

In the embodiments referred to, FIG. 1, using a pair of single pair of opposing gland-"O"-ring combinations, and FIG. 2, depicting three such combinations, are meant only as exemplary of the disclosed inventive concept, it being obvious that greater pressures are dealt with by merely increasing the number of discrete opposed gland-"O"-ring combinations and their interrelated structure.

The teachings of the invention, using gland-"O"-ring combinations and pressure regulators, are, with slight modification, adaptable to seal rotating machinery where pressures are excessive.

Although it is recognized that subjecting dissimilar materials, such as the glass hemispherical shells, and a steel cylindrical housing gives rise to design problems regarding the different flexure rates of the different materials, the sealing arrangement taken by itself, provides an unlimited capability for dealing with ambient pressures at the materials' juncture points. If hull 15 were also constructed of glass, discrete rates of flexure under intense pressures would present no problems.

The disclosed method of sealing a joint is not limited to the use of glass alone, since other brittle building materials such as concrete cannot withstand moderate tensile forces and can, therefore, benefit from the invention.

Obviously, many modifications and variations of the present invention are possible in the light of the above teachings, and, it is therefore understood that within the scope of the disclosed inventive concept, the invention may be practiced otherwise than as specifically described.

What is claimed is:

1. An assembly for sealing a juncture isolating a fluid at low pressure from a fluid at high pressure comprising:
    a housing member having a peripheral channel;
    a wall member reaching across said peripheral channel shaped with a portion having a thickness slightly less than the width of said channel and being disposed therein, said portion constructed to bear the area-pressure-product differential between the low pressure fluid and the high pressure fluid exerted on said wall member;
    a fluid filling the space between said thickness and said width; and
    means for hydrostatically retaining said fluid in said space to hold said portion away from the inner surfaces of said channel minimizing the creation of failure-producing tensile forces in said portion attendant direct bearing contact between said housing member and said wall member.

2. An assembly according to claim 1 in which said housing member is cylindrical-shaped with said channel being an annular channel having a rectangular cross-sectional configuration and said wall member is a hemispherical shell with said portion being a cylindrical projection having a rectangular cross-sectional configuration integral with said hemispherical shell.

3. An assembly according to claim 2 in which the hydrostatic retaining means is at least one pair of opposed gland-"O"-ring combinations carried on the walls of said annular channel and said cylindrical projection.

4. An assembly according to claim 3 further including:
    a plurality of said gland-"O"-ring combinations forming a plurality of adjacent annular spaces.

5. An assembly according to claim 4 further including:
    a plurality of pressure regulators each provided with a duct communicating with a discrete one of said annular spaces to maintain the pressure differential between adjacent said annular spaces below the failure-pressure differential of said gland-"O"-ring combinations.

* * * * *